(12) United States Patent
Isakiewitsch et al.

(10) Patent No.: US 9,120,506 B2
(45) Date of Patent: Sep. 1, 2015

(54) SUBFRAME FOR A MOTOR VEHICLE

(71) Applicant: AUDI AG, 85045 Ingolstadt (DE)

(72) Inventors: Christian Isakiewitsch, Ingolstadt (DE); Siegfried Achhammer, Regensburg (DE); Stefan Rugies, Regensburg (DE); Björn Elias, Hepberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/092,192

(22) Filed: Nov. 27, 2013

(65) Prior Publication Data

US 2014/0145423 A1    May 29, 2014

(30) Foreign Application Priority Data

Nov. 29, 2012  (DE) .......................... 10 2012 023 363

(51) Int. Cl.
B62D 21/11   (2006.01)
B60L 11/18   (2006.01)

(52) U.S. Cl.
CPC ............... *B62D 21/11* (2013.01); *B60L 11/182* (2013.01); *Y02T 10/7005* (2013.01); *Y02T 90/122* (2013.01); *Y02T 90/14* (2013.01)

(58) Field of Classification Search
CPC ....... B60L 11/182; B62D 21/00; B62D 21/11
USPC ............ 180/311, 312, 68.5; 191/10; 280/781, 280/785, 124.109; 320/108
See application file for complete search history.

(56) References Cited

U.S. PATENT DOCUMENTS

| | | | | |
|---|---|---|---|---|
| 4,365,681 A * | 12/1982 | Singh | ........................... | 180/68.5 |
| 5,390,754 A * | 2/1995 | Masuyama et al. | ........... | 180/68.5 |
| 5,573,090 A * | 11/1996 | Ross | ............................... | 191/10 |
| 5,821,728 A * | 10/1998 | Schwind | ....................... | 320/108 |
| 6,428,046 B1 * | 8/2002 | Kocer et al. | .................... | 280/781 |
| 6,511,096 B1 * | 1/2003 | Kunert et al. | .................. | 280/785 |
| 7,520,355 B2 * | 4/2009 | Chaney | ......................... | 180/68.5 |
| 7,575,250 B2 * | 8/2009 | Werner et al. | ................. | 280/781 |
| 7,694,982 B2 * | 4/2010 | Kim | ....................... | 280/124.109 |
| 8,079,435 B2 * | 12/2011 | Takasaki et al. | ............. | 180/68.5 |
| 8,217,319 B2 | 7/2012 | Elias | | |
| 8,418,823 B2 * | 4/2013 | Matsumura | ...................... | 191/10 |
| 8,684,382 B2 * | 4/2014 | Buschjohann et al. | | 280/124.109 |
| 8,708,401 B2 * | 4/2014 | Lee et al. | .................. | 296/187.03 |

(Continued)

FOREIGN PATENT DOCUMENTS

| | | |
|---|---|---|
| DE | 102009029883 | 12/2010 |
| DE | 102010042395 | 4/2012 |

(Continued)

OTHER PUBLICATIONS

European Search Report of Dec. 12, 2014.

*Primary Examiner* — Paul N Dickson
*Assistant Examiner* — Robert A Coker
(74) *Attorney, Agent, or Firm* — Henry M. Feiereisen LLC

(57) ABSTRACT

A subframe of a front or rear part of a motor vehicle includes two longitudinal members arranged in spaced-apart relationship in a vehicle transverse direction and connected to one another by a cross member. A reinforcement is connected to the longitudinal members and the cross member for increasing a torsion resistance of the subframe and has integrated therein a charge module which is configured to transmit energy in a contactless manner.

18 Claims, 2 Drawing Sheets

(56) References Cited

U.S. PATENT DOCUMENTS

| | | | |
|---|---|---|---|
| 8,789,634 B2* | 7/2014 | Nitawaki | 180/68.5 |
| 2002/0033594 A1* | 3/2002 | Yamamoto et al. | 280/781 |
| 2005/0173170 A1* | 8/2005 | Miyajima et al. | 180/68.5 |
| 2008/0196957 A1* | 8/2008 | Koike et al. | 180/68.5 |
| 2009/0242299 A1* | 10/2009 | Takasaki et al. | 180/68.5 |
| 2010/0156346 A1 | 6/2010 | Takada et al. | |
| 2012/0242286 A1* | 9/2012 | Takada et al. | 320/108 |
| 2012/0242447 A1* | 9/2012 | Ichikawa | 336/84 C |
| 2012/0319389 A1* | 12/2012 | Takahashi et al. | 280/781 |
| 2013/0114640 A1 | 5/2013 | Elias | |

FOREIGN PATENT DOCUMENTS

| | | |
|---|---|---|
| DE | 102010055369 | 6/2012 |
| EP | 0253345 | 1/1988 |
| EP | 0941912 | 9/1999 |
| EP | 941912 A1 * | 9/1999 |
| EP | 1690779 | 8/2006 |
| FR | 2968605 A1 | 11/2012 |
| JP | 2002-087319 | 3/2002 |
| WO | WO2012/157333 | 11/2012 |

* cited by examiner

SUBFRAME FOR A MOTOR VEHICLE

CROSS-REFERENCES TO RELATED APPLICATIONS

This application claims the priority of German Patent Application, Serial No. 10 2012 023 363.9, filed Nov. 29, 2013, pursuant to 35 U.S.C. 119(a)-(d), the disclosure of which is incorporated herein by reference in its entirety as if fully set forth herein.

BACKGROUND OF THE INVENTION

The present invention relates to a subframe of a front or rear part of a motor vehicle.

The following discussion of related art is provided to assist the reader in understanding the advantages of the invention, and is not to be construed as an admission that this related art is prior art to this invention.

A subframe is used in the automobile construction to secure body-side points of articulation of a wheel suspension. Oftentimes, the subframe of the vehicle front is used for attachment of a power engine, transmission, or steering. The subframe is normally mounted elastically to the vehicle body via rubber bearings and has a reinforcement which can be a rigid plate to increase stiffness of the subframe or a strut assembly to additionally absorb forces.

It would be desirable and advantageous to provide an improved subframe for a motor vehicle to obviate prior art shortcomings.

SUMMARY OF THE INVENTION

According to one aspect of the present invention, a subframe of a front or rear part of a motor vehicle includes two longitudinal members arranged in spaced-apart relationship in a vehicle transverse direction, a cross member connecting the longitudinal members with one another, a reinforcement connected to the longitudinal members and the cross member for increasing a torsion resistance of the subframe, and a charge module integrated in the reinforcement and configured to transmit energy in a contactless manner.

The present invention resolves prior art problems by integrating the charge module in the reinforcement. In this way, the installation space that is anyway required for stiffening the subframe is utilized for a further function, i.e. the contactless energy transfer to the motor vehicle. As a result, installation space is saved, in particular in vertical vehicle direction. The charge module is to be understood as a vehicle-side part of a system for contactless energy transfer, as shown by way of example in DE 10.2010 042 395 A1 or EP 0 253 345 B1, to which reference is made herewith. Electric energy (inductive) is hereby transmitted from a transmitter, advantageously a stationary transmitter, to the vehicle-side mounted charge module for further use. To increase efficiency, the charge module and the transmitter are positioned as closely as possible, i.e. a deep positioning of the (plate-shaped) charge module upon the motor vehicle is sought.

According to another advantageous feature of the present invention, the longitudinal members are arranged in symmetry and may be connected directly or indirectly, for example via a cast node, with at least one cross member to form an open or closed frame construction.

According to another advantageous feature of the present invention, the reinforcement may have a free space which is filled by the charge module at least in part. The free space can be an opening in the material of the reinforcement and is advantageously arranged in midsection of the reinforcement. The charge module is placed into the free space, thereby further minimizing the need for installation space, especially in vertical vehicle direction. Advantageously, the charge module and the reinforcement are flush-mounted at their bottom side when installed, so that the ground clearance is not adversely affected.

According to another advantageous feature of the present invention, the charge module can include a shielding plate and a coil unit. The presence of a shield is required to separate the coil unit from surrounding ferro-magnetic components, such as, e.g., longitudinal members, cross member, reinforcement. Advantageously, the shielding plate is made of aluminum and surrounds the coil unit at least in part such that the shielding plate is positioned between the ferro-magnetic components and the coil unit. The coil unit is penetrated, at least in part, during operation by a magnetic alternating field of the (geostationary) transmitter so as to induce a voltage. A suitable electronic power device converts the voltage and feeds it to the on-board power supply of the motor vehicle.

According to another advantageous feature of the present invention, the shielding plate can be connected with the reinforcement. Forces and torques absorbed by the reinforcement are thus transferred to the shielding plate. This positively affects torsion and strength properties of the subframe.

According to another advantageous feature of the present invention, the charge module can include an isolating element which is arranged between the shielding plate and the coil unit. In this way, the coil unit is protected from damage, when the shielding plate becomes deformed. The coil unit is normally very sensitive to bending and torsion which may be generated in the shielding plate during travel. Advantageously, the isolating element may be realized as a (rubber)-elastic support of the coil unit upon the shielding plate.

According to another advantageous feature of the present invention, the coil unit can be disposed in installed state geodetically below the shield. This ensures an optimum interaction with a road-side transmitter whereas the shielding plate provides a shield against the ferro-magnetic components of the motor vehicle at the top.

According to another aspect of the present invention, a motor vehicle includes a subframe having two longitudinal members arranged in spaced-apart relationship in a direction transverse to a vehicle, a cross member connecting the longitudinal members with one another, a reinforcement connected to the longitudinal members and the cross member for increasing a torsion resistance of the subframe, and a charge module integrated in the reinforcement and configured to transmit energy in a contactless manner, and an electric energy storage connected to the charge module.

According to another advantageous feature of the present invention, the energy storage may be a traction battery. When the motor vehicle moves across a geostationary, road-side transmitter, the coil unit of the charge module in the reinforcement of the subframe receives the magnetic alternating field as sent out by the transmitter and a voltage is induced. The voltage is transferred by the electronic power device to the traction battery which is thereby charged. To move the motor vehicle, voltage may later be drawn from the traction battery again to drive the electric machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
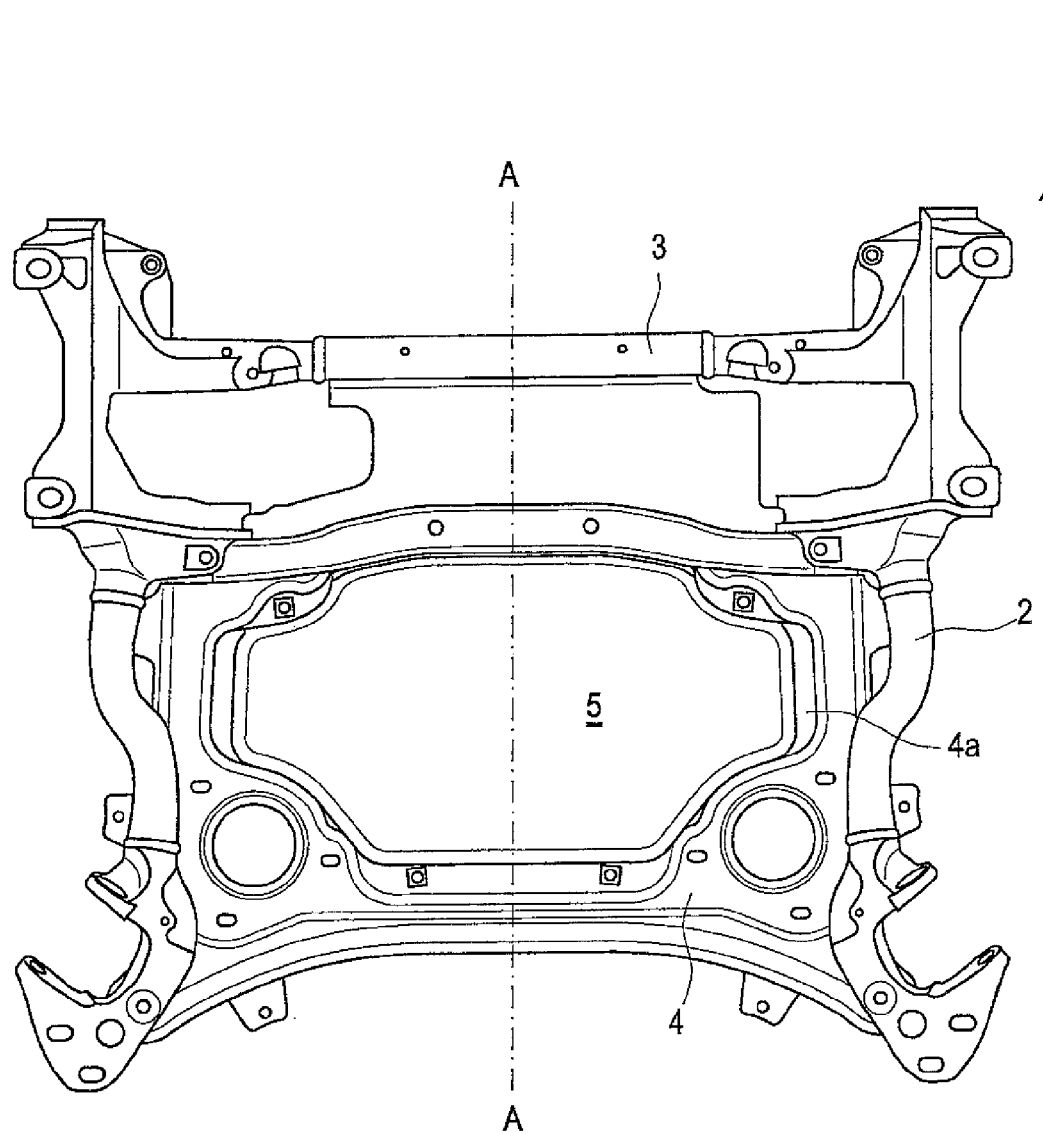
FIG. 1 is a top view of a subframe according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top view of a subframe according to the present invention, generally designated by reference numeral 1, for a motor vehicle. The subframe 1 includes two longitudinal members 2 which are arranged in spaced-apart relationship as mirror images in symmetry to a symmetry line A-A, and a cross member 3 which connects the longitudinal members 2 to one another. The subframe 1 further includes a reinforcement 4 configured, e.g., in the form of a rigid plate, for increasing torsional stiffness. The reinforcement 4 is provided in midsection with a free space 4a for accommodating a charge module 5 which, when installed, is substantially flush-mounted with its bottom side with the surrounding reinforcement 4. The charge module 5 thus becomes a component of the reinforcement 4 and, in turn, contributes to a stiffening of the subframe 1.

The reinforcement 4 may be configured as a rigid plate, as shown in FIG. 1 or in the form of a strut assembly, e.g. cross-shaped strut assembly, which is capable to additionally absorb forces.

Figure 2:
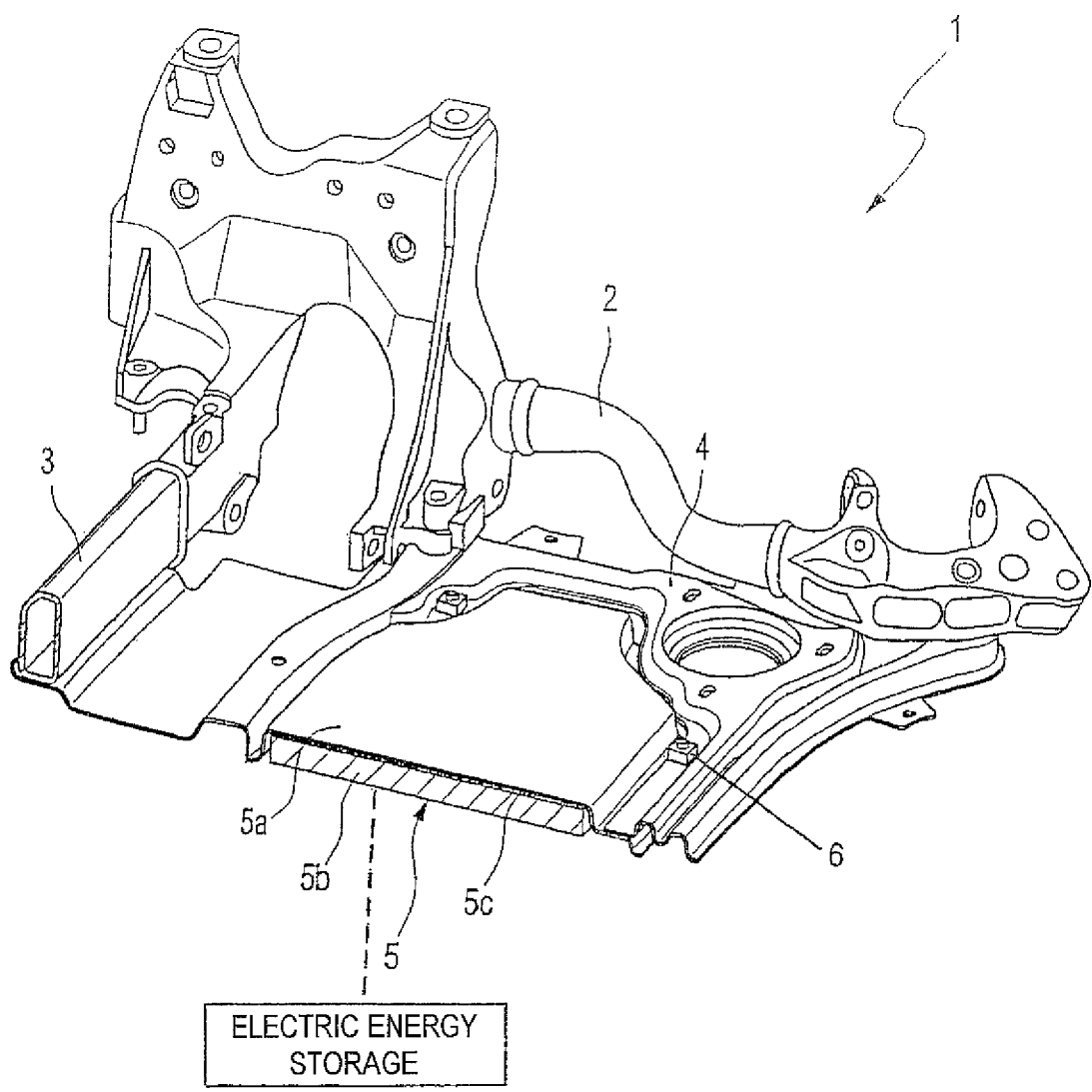
FIG. 2 is a lateral sectional view of the subframe, taken along a symmetry line A-A in FIG. 1.

FIG. 2 shows a section half of the subframe 1, depicting one of the longitudinal members 2 and the cross member 3. The charge module 5 includes a shielding plate 5a, a coil unit 5b, and an isolating element 5c which is arranged between the shielding plate 5a and the coil unit 5b. The shielding plate 5a is made, advantageously, of light metal such as aluminum and is threadably engaged by screw fasteners 6 with its marginal areas with the reinforcement 4 so that the reinforcement 4 is able to introduce forces and torques into the shielding plate 5a. The isolating element 5c decouples the coil unit 5b from any deformation the shielding plate 5a may undergo. The margins of the shielding plate 5a are configured to extend downwards beyond the sides of the coil unit 5b to provide better shielding.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A subframe of a front or rear part of a motor vehicle, comprising:
    two longitudinal members arranged in spaced-apart relationship in a vehicle transverse direction;
    a cross member connecting the longitudinal members with one another;
    a reinforcement connected to the longitudinal members and the cross member for increasing a torsion resistance of the subframe; and
    a charge module configured to transmit energy in a contactless manner, said charge module being placed in a free space of the reinforcement and having a marginal area configured for connection to the reinforcement,
    wherein the charge module includes a coil unit and a shielding plate placed in relation to the coil unit such as to separate the coil unit from a surrounding ferro-magnetic component.

2. The subframe of claim 1, wherein the longitudinal members are arranged in symmetry to one another.

3. The subframe of claim 1, wherein the longitudinal members are connected via a cast node with the cross member to form an open or closed frame construction.

4. The subframe of claim 1, wherein the free space is provided in midsection of the reinforcement.

5. The subframe of claim 1, wherein the charge module has a bottom side and the reinforcement has a bottom side which extends in alignment with the bottom side of the charge module, when the charge module is attached in the free space of the reinforcement.

6. The subframe of claim 1, wherein the coil unit is disposed below the shielding plate.

7. The subframe, of claim 6, wherein the shielding plate is made of aluminum.

8. The subframe of claim 6, wherein the shielding plate is connected with the reinforcement.

9. The subframe of claim 6, wherein the charge module includes an isolating element arranged between the shielding plate and the coil unit.

10. The subframe of claim 9, wherein the isolating element is configured as a rubber-elastic support of the coil unit upon the shielding plate.

11. The subframe of claim 6, wherein the coil unit is disposed below the shielding plate geodetically in an installed state.

12. The subframe of claim 6, wherein the marginal area is part of the shielding plate and configured for connection with a marginal area of the reinforcement.

13. The subframe of claim 12, further comprising a screw fastener configured to connect the marginal area of the shielding plate and the marginal area of the reinforcement to one another.

14. A motor vehicle, comprising:
    a subframe having two longitudinal members arranged in spaced-apart relationship in a direction transverse to a vehicle, a cross member connecting the longitudinal members with one another, a reinforcement connected to the longitudinal members and the cross member for increasing a torsion resistance of the subframe, and a charge module configured to transmit energy in a contactless manner, said charge module being placed in a free space of the reinforcement and having a marginal area configured for connection to the reinforcement, said charge module including a coil unit and a shielding plate placed in relation to the coil unit such as to separate the coil unit from a surrounding ferro-magnetic component; and an electric energy storage connected to the charge module.

15. The motor vehicle of claim 14, wherein the electric energy storage is a traction battery.

16. The motor vehicle of claim 14, wherein the shielding plate has a marginal area configured for connection with a marginal area of the reinforcement.

17. The motor vehicle of claim 16, further comprising a screw fastener configured to connect the marginal area of the shielding plate and the marginal area of the reinforcement to one another.

18. The motor vehicle of claim 14, wherein the coil unit is disposed below the shielding plate.

\* \* \* \* \*